US005754977A

United States Patent [19]
Gardner et al.

[11] Patent Number: 5,754,977
[45] Date of Patent: May 19, 1998

[54] SYSTEM AND METHOD FOR PREVENTING ENROLLMENT OF CONFUSABLE PATTERNS IN A REFERENCE DATABASE

[75] Inventors: Marc A. Gardner, Plano; Tuan K. Nguyen, Garland, both of Tex.

[73] Assignee: InterVoice Limited Partnership, Reno, Nev.

[21] Appl. No.: 611,709

[22] Filed: Mar. 6, 1996

[51] Int. Cl.$^6$ .................................................... G10L 7/08
[52] U.S. Cl. ......................... 704/243; 704/238; 704/231
[58] Field of Search ........................... 395/2.53, 2.54, 395/2.52, 2.49, 2.47, 2.48, 2.45; 704/251, 235, 231, 200

[56] References Cited

U.S. PATENT DOCUMENTS

| | | | |
|---|---|---|---|
| 4,355,302 | 10/1982 | Aldefeld et al. | 395/2.52 |
| 4,866,778 | 9/1989 | Baker | 395/2.63 |
| 4,972,485 | 11/1990 | Dautrich et al. | 395/2.6 |
| 4,975,959 | 12/1990 | Benbassat | 395/2.49 |
| 5,299,284 | 3/1994 | Roy | 395/22 |
| 5,350,303 | 9/1994 | Fox et al. | 434/118 |
| 5,452,397 | 9/1995 | Ittycheriah et al. | 395/2.49 |

OTHER PUBLICATIONS

Edward A. Patrick, Fundamentals of Pattern Recognition, Prentice-Hall, Englewood Cliffs, N.J., 1972, pp. 1-4.

*Primary Examiner*—David R. Hudspeth
*Assistant Examiner*—Donald L. Storm
*Attorney, Agent, or Firm*—Fulbright & Jaworski L.L.P.

[57] ABSTRACT

A system and method for increasing the reliability of data matches between data stored in a database and newly provided data. The system relies on the prescreening of newly provided data patterns to insure that any newly provided data pattern is not ambiguous with existing data patterns. A threshold level is calculated for each newly provided data pattern and the invention determines which stored data pattern is closest to, or most likely to be confused with, the newly provided data pattern. The invention temporarily prohibits the new data pattern from being added to the database if it is likely to be confused with a stored data pattern. A user can then choose either to change the new data pattern to a different pattern or to allow the potentially confusing new data pattern to be added to the database. The calculated threshold levels can be set for both individual users and groups of users. The data patterns can consist of speech, images, graphs or other data.

23 Claims, 1 Drawing Sheet

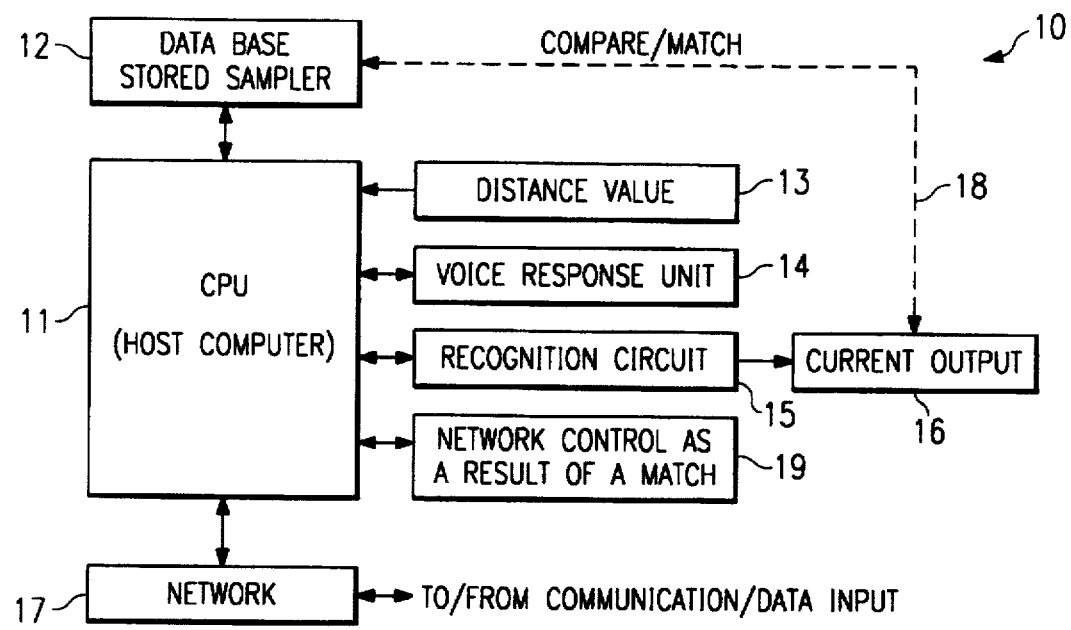
FIG. 1
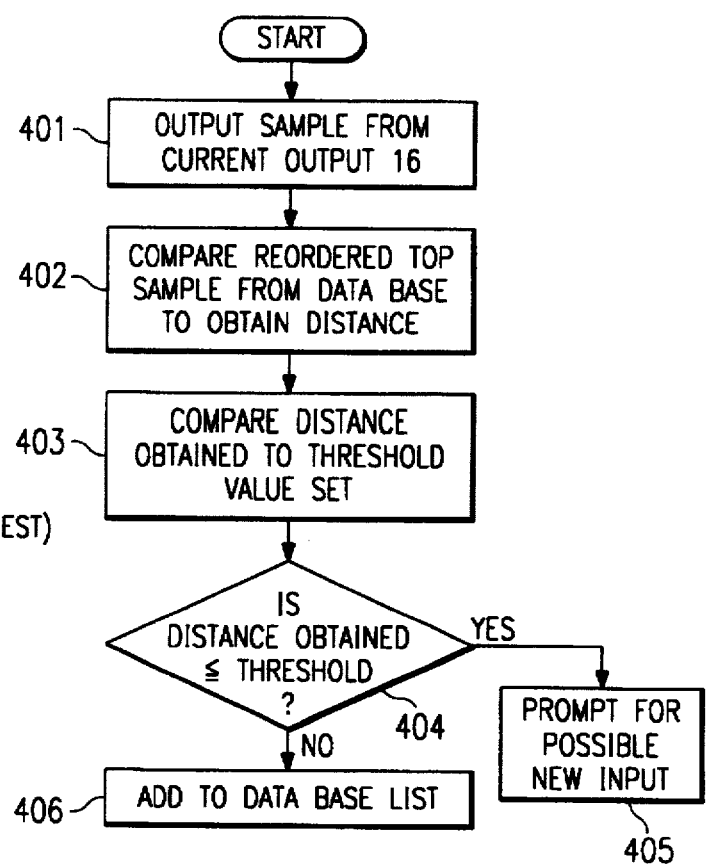
FIG. 2
MARC GARDNER
INTERVOICE
AWAY
MOM
DAD
MIKE
OFFICE
HOME
CAR
SON
CHUCK
FIG. 3
CURRENT OUTPUT = TOM
SORTED LIST (CLOSEST TO FARTHEST)
MOM
SON
CAR
HOME
OFFICE
DAD
CHUCK
MIKE
AWAY
INTERVOICE
MARC GARDNER
FIG. 4

SYSTEM AND METHOD FOR PREVENTING ENROLLMENT OF CONFUSABLE PATTERNS IN A REFERENCE DATABASE

BACKGROUND OF THE INVENTION

The problem that we are trying to solve arises when data is being stored which is in some manner uniquely dependent on the person (or machine) doing the storing. Typically, this is called speaker dependent recognition and arises when a person is storing a word for later voice recognition. The problem is not necessarily with voice only, but it can arise with different types of data or image storage. In such systems as data is stored in the system, samples are stored and are then later compared with utterances (or other data input) coming from the same speaker. When the system is being initialized and the words or samples are being stored, there is an inherent problem in which subsequent new words can be too close or too similar to existing words or data such that the probability of a proper recognition will decrease such that during the use of the system, it will have to try and figure out which stored utterance matches the input word. Since multiple stored words can be similar to the newly inputted word, the system doesn't have a clear idea of which word was actually spoken. Thus, the basic problem that we are trying to solve is to increase the recognition reliability of stored data.

In recognition systems, to accomplish this goal one would typically design the system to have inherently high resolution capability to avoid ambiguities and to allow for variations between different users so that the system need not be so highly trained that only a particular speaker speaking the same word in the same way will be recognized.

These are common goals for many years and several systems have developed with algorithms to increase system reliability. Some of these solutions are expensive, and some of them work better than others. Therefore, it would be helpful to have a system which need not have perfect input in order to work and which will detect words (or other data) over wide ranges of users regardless of who trained the system and how the system responds to stimuli.

Therefore, it is one object of this invention to improve the reliability of data recognition to a point where any time an utterance is processed by the system, it will always be recognized and acted upon immediately without additional input from the user and without ambiguity.

Another object would be to improve the recognition hit rate, or accuracy rate, so as to improve the effectivity of the system by taking less time resolving ambiguities.

SUMMARY OF THE INVENTION

We have solved these and other problems and objectives by designing a system that actually solves ambiguities (or at least identifies ambiguities) at a time when the data is being stored in the system. In our system when the samples are initially stored, the system identifies, using one or more algorithms, those samples that are similar to already stored samples. An example would be the word "Tom" is spoken and the word "Mom" already existed in the database. Those are very similar sounding words and the recognition system could identify either as being the other. Thus, a high ambiguity is said to exist. Accordingly, during the initialization phase, the system would point out this fact to the user and prompt the user to pick a different word not so similar to an existing word in the database, therefore making those two words different enough so that they would not conflict with each other. In our example, the speaker would change "Tom" to "Tom Jones".

Since the system responds to the entering of a word based upon its own parameters, it happens then that each user would have a different response depending upon how the system heard that user and how that user pronounced certain words. Also the system would self-correct since the recognition system itself determines how close a word is to another word or how likely an interference situation would occur. Thus, systems that may not have a high recognition capability can be made to respond as though they had a resolution capability beyond their design capability.

Accordingly, one aspect of our invention is to enhance existing systems to increase the reliability of the recognition of a particular word even when, in the abstract, such a system would otherwise have a difficult time.

In one embodiment of the system, the similarity of data is determined by a distance algorithm that takes numerical samples and applies a mathematical threshold to determine "closeness".

One technical advantage of our invention is that it improves the recognition reliability of systems that have lower recognition algorithms thereby making the system work more efficiently regardless of its underlying technology.

Another technical advantage of our system and method is that the recognition reliability of the system becomes very efficient and the user has a feeling that the system works well and is very reliable and thus is encouraged to use it even more.

Another advantage of this invention is that it is not only useful for voice input, but it will work for any type of input such as, for example, an image input. In such a situation, different image files are stored and as each is stored, the new image is compared to the existing images to see if it is too "close". Thus, when a new image is to be added, a determination of closeness is made so that a possible ambiguity is resolved by asking the user to change the image in some way so that it would become more distinct for subsequent identification. This can be critically important in situations where mismatched errors are vital that they do not occur. Using our system and method, a user would "add" some data to a stored file (modify the image) simply by adding a key or unique portion to the data file and thus will increase the reliability of proper subsequent recognition to whatever level is desired by the user.

A further technical advantage of our invention is that in the situation of image files or other types of data files, a known overlay that is unique to that file from user-to-user for each image can be used so that there can be no mistake that regardless of the input of the raw image.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 shows a block diagram of the overall aspects of our invention;

FIG. 2 shows a list of recorded words;

FIG. 3 shows the currently desired input word to be stored together with a recorded list of previously stored words; and FIG. 4 shows a flow chart of the system operation.

DESCRIPTION OF THE PREFERRED EMBODIMENTS

Turning now to FIG. 1 there is shown system 10 having network block 17 which can be a variety of different network connections, such as, by way of example, T1, E1 or it can be a data network such as ethernet or token ring. In situations where only local operation is required, the network connection can be a simple microphone connection. For applications where data, such as charts or graphs or pictures are to be matched, the input would be modified to accept the data format of the desired match object. The input data then is routed, via CPU 11, to recognition circuit 15. The output of recognition circuit 15 is a conversion of the input data to a desired output in a format for data matching. This would occur in block 16.

The system then sorts the stored samples from database 12 from closest to farthest and compares the closest sample in database 12 with the current output value in block 16 and provides a distance calculation in block 13 between the current output and the closest sample in the database. Based upon this distance calculation and as compared to a threshold value, a determination is made as to whether or not a high enough comfort level exists to allow the new word to be stored. If it is under the threshold value, the top sample is too close to the current output and voice response unit 14 then tells the user that the current output value (the desired new storage word) is too close to one of the samples currently stored in the database and suggests that the user may want to consider changing the sample in some manner to move it farther away from existing samples, thereby reducing the probability of multiple possible matches. The value stored in block 13 could be changed via CPU 11.

Block 19 provides for system control, for example a telephone dialer, which provides unique outputs depending upon which data pattern has been matched, i.e., different telephone numbers.

In FIG. 2, this is shown as an arbitrary list of a few words that are currently stored in the database for a particular user. This list of samples is not ordered in any particular manner. Note, of course, that these words could be data representing pictures, phrases, graphics, charts, voice prints, etc.

FIG. 3 shows the situation where the user, by inputting a spoken word via network 17 (FIG. 2) desires to add the word "Tom" to the list of words available for subsequent recognition. Thus, "Tom" becomes the current output value in block 16 (FIG. 1). The system then will reorder the sample list based on distance calculations from closest to furthest away. In this case, the "Mom" sample becomes the top choice since the system has determined that there is no word in the current database "closer" to the current input "Tom". In the particular case of the algorithm we envision using, the distance calculation subtracts the current output from one of the stored samples and obtains a difference between each one of twenty-six values which are then summed to obtain a value.

$$D = 0;$$
$$\text{for } (i = 0; i < 26; i++)\{$$
$$D_i = (C_s[i] - C_o[i])^2;$$
$$D = D + D_i;$$
$$\}$$
$$D = \sqrt{D}$$

Where:
D=Distance between Current output and the Closest sample,
$D_i$=Coefficient delta,
$C_s$=Closest sample coefficient array
$C_o$=Current output coefficient array In FIG. 3, the order shown (other than "Mom") is arbitrary in our illustration and will depend upon the algorithm used.

In FIG. 4, system operation is shown where the output sample box 401, comes from block 16 (FIG. 2). The list is reordered, box 402, to obtain a "distance" calculation, as discussed above. That value is then compared, or the distance is calculated, between the current output and the top sample in the ordered list via box 403. In our example, the calculated distance is between the word "Tom" and the word "Mom" as shown in FIG. 3.

That distance value is then compared against a predefined threshold value via box 404 which, if desired, can be changed from time to time to give different levels of threshold and comfort with the system. The value in box 404 can be a multiple value depending upon the context. If the current distance that has been calculated is less than or equal to the current threshold value then box 405 prompts the user for possible new input. Therefore the user has the option of accepting or reinputting the value to make it less similar, i.e. more unique.

In operation, the system would say to a user, please say the word you would like to add. The caller says the word "Tom". The system then, after performing its calculations and determining that the threshold level between "Tom" and "Mom" is too close (below its currently established threshold level) will respond by saying, "the word Tom is very similar to the word "Mom" which already exists in your name list. Would you still like to add it, or could you change "Tom" to a more unique name." The caller would then either change the word or accept the word. If the caller says "change", the system would say "give me the new word." The caller would say "Tom Jones." The system would then recalculate using FIG. 4, and if after recalculating distance determining that "Tom Jones" is indeed greater than the currently set threshold value, then the name "Tom Jones" would be added to the database list via box 406. If the new threshold is still below the set number, then the caller would be told that the name "Tom Jones is too close to an existing name and that" a new word should be added. The system would reiterate until such time as the caller either accepts a word having a less than desirable margin for error, or a word is found which yields a high probability of recognition when said at a different session.

Note that there are many systems for changing the threshold level, some of which can be self-correcting and some remotely changeable, by simply changing a number in a register. Self-changeable systems can be used, for example, to allow for changing to tolerances for different users or for different situations.

It should be noted that in the examples discussed above a human user is involved with inputting the new data pattern and a response is given to the human user requesting the user to modify the input in some manner so as to make it less likely to have an ambiguous match or to require excessive data processing time or sophisticated algorithms for selecting between very close data patterns. However, in some situations the interactions could be between processors without human intervention and the proposed input data pattern could be modified according to a predetermined formulae to move the newly entered pattern further away from existing patterns. The system could be designed to prevent the input of new patterns until such changes are made regardless of any attempt on the part of a user, human or otherwise, to have a data pattern entered.

It should be further noted that once a data pattern is accepted for storage it is then used as a pointer to other data in a database so that, for example, the number 888-9999 can be associated with the data pattern "Tom". Thus, when the system receives the word "Tom" and makes a match between the received word and the stored word "Tom" a database is entered under control of the word "Tom" and the number 888-9999 is extracted. This number can be used to dial a number through the public switching network or to perform further lookup services or simply to be provided on a screen or delivered to a specified location. In the situation with other types of data patterns, other types of lookup can be designed to yield data from a database as a result of a match. Thus, when a graphics data pattern is matched against a prestored graphics pattern a unique output is triggered. This unique output can be, for example, a spoken message or a printed message or a message to another computer.

While it has been assumed that the user had previously stored data against which the new input is to be compared, the comparison can be made against a "standard" database. In fact, two comparisons can be made, one against a standard database and one against a tailored, or user-spoken, database. Note that the acceptance tolerance levels can be different for each type of comparison.

Although the present invention and its advantages have been described in detail, it should be understood that various changes, substitutions and alterations can be made herein without departing from the spirit and scope of the invention as defined by the appended claims.

What is claimed is:

1. The method of adding data patterns to a database, said database of patterns used for matching a subsequently inputted data pattern to a previously stored data pattern to obtain a data pattern which closely matches said subsequently inputted data pattern, said method comprising the steps of accepting said subsequently inputted data pattern as a new pattern to be added to said database;

determining if any of said previously stored data patterns are within a certain match tolerance of said new pattern;

ordering said previously stored data patterns in a temporary list depending upon said new pattern; and temporarily inhibiting the adding of said new pattern to said database under control of said determining step if said new pattern is within said certain match tolerance.

2. The method set forth in claim 1, wherein said determining step further includes the step of determining the distance between said new pattern and a top data pattern on said ordered temporary list.

3. The method set forth in claim 1, wherein a user controls the input of said new pattern and wherein said temporarily inhibiting step includes the step of informing said user that said new pattern is within said certain match tolerance.

4. The method set forth in claim 1 wherein said previously stored data pattern is unique to a particular user.

5. The method set forth in claim 4 wherein said previously stored data pattern is common to a group of users.

6. The method set forth in claim 5 wherein said certain tolerance depends upon whether said stored data pattern is unique or common.

7. A system for extracting data from a database, said system comprising:

means for entering said database to extract a particular data file depending upon a match between a newly inputted data pattern and one of a plurality of data patterns previously stored in said database;

means for accepting a new data pattern for addition to said previously stored data patterns;

means for determining if any of said previously stored data patterns are within a certain match tolerance of said accepted new data pattern;

means for ordering said stored data patterns that are within said certain match tolerance in a temporary list; and means controlled by said determining means for providing a signal when said new pattern is within said certain match tolerance.

8. The invention set forth in claim 7 wherein said certain match tolerance is different depending upon the particular previously stored data pattern.

9. The invention set forth in claim 7 wherein said signal providing means further includes:

means for temporarily inhibiting said adding of said new data pattern to said previously stored data patterns when said new pattern is within said certain match tolerance.

10. The invention set forth in claim 7, wherein said data patterns are spoken words.

11. The invention set forth in claim 7, wherein said data patterns are images.

12. The invention set forth in claim 7, wherein said data patterns are graphs.

13. A data recognition system comprising:

a plurality of stored data patterns, each pattern available for comparison to a subsequently provided data pattern for yielding a unique output depending upon a match between said subsequently provided data pattern and a previously stored data pattern;

means for accepting a data pattern for storage among said stored data patterns, said accepting means including:

means for calculating for each newly provided data pattern at least one stored data pattern which is most likely to be confused with said newly provided data pattern;

means for providing a list of said at least one stored data patterns ordered from the closest to the furthest from said newly provided data pattern;

means for determining a threshold tolerance between said newly provided data pattern and said stored data pattern determined to be most likely confused with said newly provided data pattern; and means for at least temporarily delaying the storage of each newly provided data pattern when the threshold tolerance for that newly provided data pattern is below a certain level.

14. The system of claim 1 wherein said certain level is adjustable.

15. The invention set forth in claim 1 wherein said stored data patterns are unique to a particular user.

16. The invention set forth in claim 1 wherein said stored data patterns are common to a group of users.

17. The invention set forth in claim 1 wherein said calculating means includes:
means for comparing said accepted data pattern against data patterns unique to a particular user.

18. The invention set forth in claim 17 wherein said calculating means further includes:
means for comparing said accepted data pattern against data patterns common to a group of users.

19. The invention set forth in claim 18 wherein said threshold tolerance certain level is different between said comparison against said unique data patterns and said comparison against said common data patterns.

20. The system of claim 1 wherein said calculating means uses the algorithm:

$$D = 0;$$
$$\text{for } (i = 0; < 26; i ++)\{$$
$$D_i = (C_s[i] - C_o[i])^2$$

$$D = D + D_i;\}$$

$$D = \sqrt{D},$$

where:

D=Distance between Current output and the Closest sample, $D_i$=Coefficient delta, $C_s$=Closest sample coefficient array $C_o$=Current output coefficient array;

to determine if said newly provided data pattern is likely to be confused with said at least one stored data pattern.

21. The invention set forth in claim 1 wherein said data patterns are spoken words.

22. The invention set forth in claim 1 wherein said data patterns are images.

23. The invention set forth in claim 1 wherein said data patterns are graphs.

* * * * *